No. 686,102. Patented Nov. 5, 1901.
W. A. MAYBACH.
STEERING MECHANISM FOR MOTOR VEHICLES.
(Application filed Mar. 28, 1901.)
(No Model.)

Witnesses.
Herman E. Metius.
Louis W. F. Whitehead.

Inventor:—
Wilhelm A. Maybach
by his Attorneys:—

UNITED STATES PATENT OFFICE.

WILHELM A. MAYBACH, OF CANNSTADT, GERMANY, ASSIGNOR TO DAIMLER MANUFACTURING COMPANY, OF NEW YORK, N. Y., A CORPORATION OF NEW YORK.

STEERING MECHANISM FOR MOTOR-VEHICLES.

SPECIFICATION forming part of Letters Patent No. 686,102, dated November 5, 1901.

Application filed March 28, 1901. Serial No. 53,347. (No model.)

*To all whom it may concern:*

Be it known that I, WILHELM AUGUST MAYBACH, a subject of the Emperor of Germany, and a resident of Cannstadt, in the Kingdom of Würtemberg, Germany, have invented certain Improvements in Steering Mechanism for Vehicles, of which the following is a specification.

My invention relates to certain improvements in mechanism for steering motor-vehicles, having for its object the provision of a device which shall be adaptable to various positions of the operator and which may be moved out of the way of said operator when the vehicle is not in use. This object I attain as hereinafter set forth, reference being had to the accompanying drawings, in which—

Figure 2:
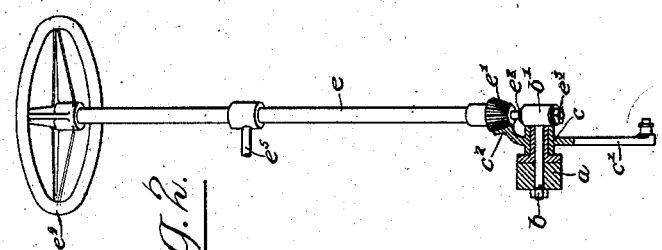
Figure 1:
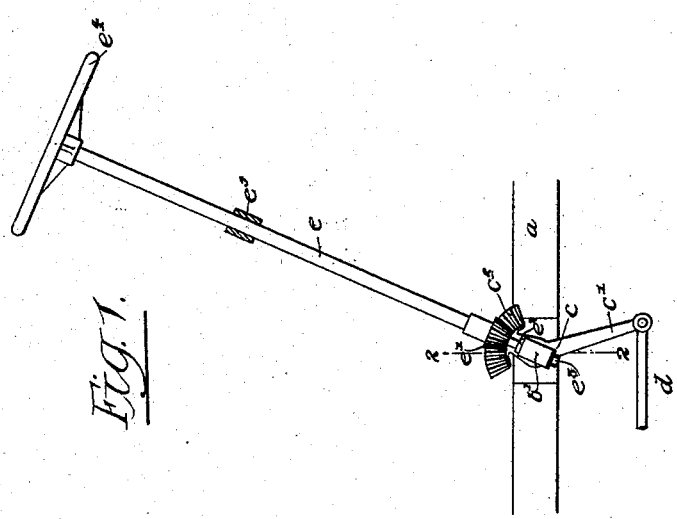

Figure 1 is a side view of my improved steering device; and Fig. 2 is a sectional view of the same, taken on the line 2 2, Fig. 1.

In the above drawings, $a$ is a portion of the frame of a motor-vehicle, through which passes a bolt $b$, having threads and a nut at one end and a tubular head $b'$, extending at right angles to the length of the bolt, at its other end. Between the tubular head and the frame $a$ is a sleeve, flanged in the present instance, on which is rotatably mounted a lever $c$. One arm $c'$ of this lever is loosely connected to a rod $d$, attached to other levers of any of the well-known constructions common in the art for altering the relative positions of the running-wheels. The other arm of the lever is made in the form of a toothed segment $c^2$, which is constructed to be engaged by a gear-wheel $e'$. A steering-rod $e$ supports this gear-wheel, and it is itself supported by the head $b'$ of the bolt $b$, through which it passes. There is a collar or flange $e^2$ on the rod and a nut $e^3$, retaining it securely in the head $b'$, while allowing of its free rotation. A hand-wheel $e^4$ is provided at the other end of the rod $e$, and, if desired, a handle $e^5$ may also be used.

In operation it will be seen that revolution of the wheel $e^4$ turns the gear-wheel $e'$, this causing the arms of the lever $c$ to alter their positions, thereby moving the rod $d$ backward or forward and changing the position of one pair of the wheels of the vehicle relatively to the others. The rod $d$, with the hand-wheel, being also revoluble about the axis of the bolt $b$, it will be noted that the hand-wheel may be operated from any position within ninety degrees on one side of a perpendicular. Should the hand-wheel (and the rod $d$) be held from turning and at the same time moved through the arc of a circle around the bolt $b$ as an axis, the rack $c^2$ will be moved with it and the steering-gear operated as if the wheel had been turned.

If it is desired to retain the rod $d$ at any given angle, the nut on the bolt $b$ may be tightened, thereby clamping the head thereof in a fixed position, while still allowing free motion of the lever $c$ on its sleeve.

When not in use, the rod $d$, with its attached hand-wheel, may be turned on the bolt $b$ to any desired position out of the way of the operator.

I claim as my invention—

1. The combination in a steering device for a motor-vehicle, of a rod pivotally supported on the frame of the vehicle, said rod being revoluble in said pivot, a lever also pivotally supported on the frame of the vehicle and connected to the wheels thereof, and means on the said rod for engaging and operating said lever, substantially as described.

2. The combination in a steering device for a motor-vehicle, of a rod, means for moving the same, a pivot on which the rod is supported, a lever also supported on said pivot and connected to the wheels of the vehicle and a device on the rod for causing the lever to turn on the pivot, substantially as described.

3. The combination in a steering device for a motor-vehicle, of a rod, means for turning the same, a gear-wheel on the rod and a pivot supporting said rod, a lever having one of its arms connected to the running-gear of the vehicle also supported on the pivot, the other arm of the lever having a toothed segment constructed to engage the gear-wheel on the rod, substantially as described.

4. The combination in a steering device for a motor-vehicle, of a rod having on it means whereby it may be turned, a pivot attached to the framework of the vehicle for supporting said rod, a sleeve on the pivot, means for clamping said pivot to the frame to prevent it from turning, a lever freely movable on said sleeve independently of the pivot, a rack on one arm of the lever, connections between the second arm of said lever and the running-gear of the vehicle, and a gear-wheel on the rod constructed to engage the teeth of said rack, substantially as described.

5. The combination in a steering device for motor-vehicles, of a headed bolt attached to the framework of the vehicle, a rod having on it a gear-wheel revolubly held to the head of said bolt, a sleeve on the bolt extending between the head thereof and the frame of the vehicle, a lever loosely mounted on said sleeve, means for clamping the bolt to the sleeve and to the frame whereby said bolt is prevented from turning without affecting the movability of the lever, a rack on one arm of said lever engaging the gear-wheel on the rod and means for connecting the second arm of the lever to the wheels of the vehicle, substantially as described.

In testimony whereof I have signed my name to this specification in the presence of two subscribing witnesses.

WILHELM A. MAYBACH.

Witnesses:
WM. HAHN,
H. E. REICHARDT.